United States Patent Office 3,527,836
Patented Sept. 8, 1970

3,527,836
DEHYDROGENATION PROCESS OVER Pt-EXCHANGED 5A SIEVE
Leonard Turner, Woking, and Philip John Hunter, Twickenham, England, assignors to The British Petroleum Company Limited, London, England, a corporation of England
No Drawing. Filed May 2, 1968, Ser. No. 726,224
Claims priority, application Great Britain, May 2, 1967, 20,168/67, 20,169/67
Int. Cl. C07c *5/18;* C01b *33/28*
U.S. Cl. 260—683.3      3 Claims

ABSTRACT OF THE DISCLOSURE

Alkanes are dehydrogenated to alkenes over small pore molecular sieves which have a platinum group metal exchanged on to their external surfaces. Alkali metal partial poisoning increases selectivity.

---

This invention relates to a process for the dehydrogenation of alkanes.

Zeolites are a well-known class of alumino-silicate minerals having a molecular structure composed of a rigid network of aluminium, silicon and oxygen atoms together with inter-changeable ions which may be, for example, metal cations, hydrogen or ammonium ions. They are also characterised by having pore openings which are uniform in size in any given zeolite, but which vary in different zeolites over a range of 3–15A.

Certain molecular sieves of medium to large pore size are known in the so-called metal loaded form. It is also known that platinum group metals supported on carriers such as silica and/or alumina are useful in the aromatisation, isomerisation and cracking of alkanes.

We have now discovered that by using certain metal loaded molecular sieve catalysts it is possible to dehydrogenate normal alkanes to normal olefins of the same carbon number. Subsequent exchange with alkali or alkaline earth metal ions considerably reduces cracking reactions.

Thus, according to the present invention there is provided a process for the dehydrogenation of a normal alkane to a normal alkene which process comprises contacting the alkane at elevated temperature with a platinum group metal loaded molecular sieve having a pore size equal to or less than that of a 5A type sieve.

The platinum groups metal is added to the molecular sieve by ion exchange so that it forms part of the zeolite rather than being supported on it. After ion exchange the resulting material is treated with a reducing agent, hydrogen being preferred. Preferably the catalyst is exchanged, after the final reduction with alkali or alkaline earth metal ions.

Suitable molecular sieve supports are those designated types 5A, 4A and 3A.

3A and 4A sieves are preferred. (These preferred supports give higher selectivity to alkenes).

The preferred platinum group metal is platinum itself. The platinum content of the catalyst lies preferably between 0.01 and 5% by weight, and most preferably between 0.1 and 1%.

Alkali or alkaline earth metal ions may be added by contacting the sieve containing free metal with a solution of an alkali or alkaline earth metal salt. This exchange must take place after the addition and reduction of the platinum group metal. It is believed that the alkali or alkaline earth metal ions exchange with protons produced by the reduction of $Pt(NH_3)_4^{2+}$.

Particularly suitable salts are the carbonates, bicarbonates and salts of organic acids.

Preferred cations are sodium and potassium, particularly the former.

Alternatively the platinum group metal containing sieve may be contacted with alkali or alkaline earth metal vapour at high temperature. Treatment with solutions of metal alkyls in organic solvents may also be used.

The amount of alkali or alkaline earth metal retained is preferably in the range 0.05 to 1.0% weight.

A suitable method for preparing the catalyst comprises passing air saturated with water over the molecular sieve support to moisten it, contacting the moistened sieve with a solution of a salt of the platinum group metal and allowing ion exchange to take place, isolating and drying the resulting ion exchanged sieve and reducing to form the catalyst. Reduction may be effected by treatment with hydrogen at elevated temperature.

After reduction, the metal containing sieve is allowed to cool. It may then be wetted with moist air as described above and the moistened sieve contacted with a solution of a salt of an alkali or alkaline earth metal to allow ion exchange to take place between the protons associated with the sieve after reduction and the alkali or alkaline earth metal ions.

Suitable normal alkanes which may be dehydrogenated include those containing from 3 to 30 carbon atoms per molecule.

Dehydrogenation is suitably effected at a temperature in the range 400 to 650° C.

Pressure should lie between 10 mm. mercury and 1000 p.s.i.g. and is preferably in the range 0–50 p.s.i.g.

The alkane may be passed over the catalyst at a LHSV in the range 0.1 to 40 vol./vol., preferably in the range 2–15 vol./vol.

In order to suppress undesirable side reactions, dehydrogenation is preferably effected in the presence of added hydrogen. Suitably the molar ratio of added hydrogen to the alkane feedstock is in the range 0.1 to 30, preferably in the range 2–10.

The invention is illustrated by the following examples.

EXAMPLE 1

A 5A sieve (30–60 mesh BSS) was dried at 450° C. for four hours in flowing nitrogen. The dry sieve (100 g.) after weighing was carefully wetted (rapid wetting causes break-down to fines) by passing air saturated with water over the material. The wetted product was placed in water (250 ml.) and heated to 80° C. Solid $Pt(NH_3)_4Cl_2 \cdot H_2O$ (0.905 g., equivalent to 0.5% Pt on the sieve) was added and the mixture stirred slowly at 80° C. for 8 hours. The solid was filtered off, washed free of Cl ($AgNO_3$ test) and dried in air (GHSV 2000), initially at 100° C., until the effluent air contained only 300 p.p.m. of water. The temperature was then slowly raised such that the effluent air contained 300–500 p.p.m. of water until the temperature was 550° C. The Pt complex was then reduced at 550° C. by displacing air with nitrogen, then passing hydrogen for 3 hours at GHSV 1000.

The catalyst was then activated and a 1:10 molar ratio of normal hexane/hydrogen passed over it for 1 hour with a hexane LHSV of 0.6.

The results obtained are set out in Table 1.

EXAMPLE 2

A 4A sieve was loaded with platinum by the method described in Example 1.

The catalyst was then activated and normal hexane/hydrogen passed over it as described in Example 1 except that the LHSV of the hexane was 1.2.

The results obtained are set out in Table 1.

EXAMPLE 3

A 3A sieve was loaded with platinum by the method described in Example 4.

The catalyst was then activated and normal hexane/hydrogen passed over it as described in Example 1. The LHSV of the hexane was 0.6.

The results obtained are set out in Table 1.

EXAMPLE 4

A 4A-XW binderless sieve was loaded with platinum by the method described in Example 2. The catalyst was then activated and normal hexane/hydrogen passed over it as described in Example 1 except that the LHSV of the hexane was again 1.2.

The results obtained are set out in Table 1.

EXAMPLE 5

A further sample of the catalyst described in Example 1 was wetted by moist air as above, placed in water (200 ml.) and treated with $NaHCO_3$ (1.7 g.) in a little water, the mixture being stirred for 4 hours.

The resulting solid was filtered, washed and dried as above.

The catalyst was then activated and normal hexane/hydrogen passed over it as described in Example 1.

The results obtained are set out in Table 1.

EXAMPLE 6

A further sample of the catalyst described in Example 2 was treated with $NaHCO_3$ as described in Example 5 and tested for hexane dehydrogenation as described in Example 2.

The results obtained are set out in Table 1.

EXAMPLE 7

A further sample of the catalyst described in Example 3 was treated with $NaHCO_3$ as described in Example 5 and tested for hexane dehydrogenation as described in Example 3.

The results obtained are set out in Table 1.

EXAMPLE 8

A further sample of the catalyst described in Example 4 was treated with $NaHCO_3$ as described in Example 5 and tested for hexane dehydrogenation as described in Example 4.

The results obtained are set out in the following Table 1.

TABLE 1

| Example | Catalyst | Pt content, percent wt. | LHSV of n-$C_6$ | Conversion of n-$C_6$ | Selectivity wt. percent to— n-Hexenes | Benzene | Others[1] | Gas[2] |
|---|---|---|---|---|---|---|---|---|
| 1 | Pt-5A | 0.29 | 0.6 | 24.1 | 40.8 | 18.0 | 8.0 | 33.2 |
| 5 | Pt-5A-Na | 0.29 | 0.6 | 28.8 | 37.5 | 18.6 | 16.7 | 26.4 |
| 2 | Pt-4A | 0.35 | 1.2 | 12.3 | 6.25 | 6.9 | 3.3 | 27.3 |
| 6 | Pt-4A-Na | 0.35 | 1.2 | 27.4 | 57.6 | 21.5 | 15.1 | 5.8 |
| 3 | Pt-3A | 0.28 | 0.6 | 19.4 | 37.7 | 19.3 | 13.6 | 29.3 |
| 7 | Pt-3A-Na | 0.28 | 0.6 | 28.1 | 39.1 | 33.9 | 20.8 | 6.1 |
| 4 | Pt-4A-XW | 0.30 | 1.2 | 23.6 | 65.8 | 12.4 | 9.6 | 12.2 |
| 8 | Pt-4A-XW-Na | 0.30 | 1.2 | 22.8 | 71.5 | 15.8 | 7.9 | 4.8 |

[1] n-Hexadienes, cyclic olefins and dienes, cyclo-alkanes.
[2] $C_1$ to $C_4$ alkanes and alkenes.

EXAMPLES 9-13

The catalysts were made by a standard procedure from the appropriate sieve as follows:

The sieve (30-60 mesh BSS) was dried 450° C. for 4 hours in flowing nitrogen. The dry sieve (100 g.) after weighing was carefully wetted (rapid wetting causes breakdown to fines) by passing air saturated with water over the material. The wetted product was placed in 250 ml. water and heated to 80° C. 0.9 gram of solid $Pt.(NH_3)_4Cl_2.H_2O$ was added and the mixtures stirred slowly at 80° C. for 8 hours. The solid was filtered off, washed free of chloride ions ($AgNO_3$ test) and sucked dry on the funnel. It was dried in air, initially at 100° C. until the effluent air contained only 300 p.p.m. of water. The temperature was slowly raised such that the effluent air contained 300-500 p.p.m. of water, until the temperature reached 550° C. The platinum complex was then reduced at 550° C. by displacing air by nitrogen, then passing hydrogen for 3 hours at GHSV 1000. Hydrogen and n-undecane were then pased over the catalyst under the conditions shown below. The results are set out in the following Table 2.

Temperature, ° C.—440
LHSV of n-undecane—3.0
Hydrogen/n-undecane molar ratio—4.1

TABLE 2

| Ex. No. | Molecular sieve | Percent Pt. | Conversion, percent | Selectivity, wt. percent n-Undecenes | $C_1$-$C_{10}$ (cracked products) | Dienes aromatics |
|---|---|---|---|---|---|---|
| 9 | Bayer 3A | 0.29 | 13.3 | 88 | 12 | 0 |
| 10 | Linde 4A | 0.36 | 9.8 | 82 | 13 | 5 |
| 11 | Linde 4AXW | 0.31 | 11.2 | 84 | 16 | 0 |
| 12 | Linde 5A | 0.23 | 20.2 | 73 | 14 | 13 |
| 13 | Linde 10X | 0.39 | 13.7 | 6 | 86 | 8 |

N.b.—Samples collected over a period of 45 minutes after 15 minutes on stream.

It is known that in the dehydrogenation of n-alkanes to the corresponding n-alkenes the selectivity to n-alkenes falls as the conversion rises. The effect of partial poisoning by sodium ions can be seen to be either to permit the same n-alkene selectivity at a higher conversion (compare Examples 1 with 5 and 2 with 6), or to permit a higher n-alkene selectivity at the same conversion. Example 13 does not show the process according to the present invention as it uses a large pore size sieve. The enormous decrease in selectivity and high proportion of cracked products may be seen.

What we claim is:
1. A process for the dehydrogenation of a $C_{3-30}$ normal alkane to a normal alkene characterised in that the alkane is contacted at a temperature in the range 400°–650° C., a pressure in the range 10 mm. mercury to 1000 p.s.i.g. and a LHSV in the range 0.1–40, with a catalyst consisting essentially of an alkali or alkaline earth metal modified platinum exchanged molecular sieve having a pore size equal to or less than that of a 5A sieve and containing 0.1–1% by weight platinum and 0.05–1% by weight of alkali or alkaline earth metal.

2. A process according to claim 1 wherein the alkali metal is sodium.

3. A process according to claim 1 wherein dehydrogenation is effected in the presence of added hydrogen, the molar ratio of added hydrogen to the alkane feedstock lying in the range 0.1:1 to 30:1.

References Cited

UNITED STATES PATENTS

| | | | |
|---|---|---|---|
| 3,126,426 | 3/1964 | Turnquest et al. | 260—683.3 |
| 3,168,587 | 2/1965 | Michaels et al. | 260—683.3 |
| 3,140,252 | 7/1964 | Frilette et al. | 208—120 |
| 3,140,253 | 7/1964 | Blank et al. | 208—120 |
| 3,277,018 | 10/1966 | Plank et al. | 208—683.3 |
| 3,236,910 | 2/1966 | Bukata et al. | 260—683.3 |
| 3,293,319 | 12/1966 | Haensel et al. | 260—683.3 |

DELBERT E. GANTZ, Primary Examiner

G. E. SCHMITKONS, Assistant Examiner

U.S. Cl. X.R.

252—455

PO-1050
(5/69)

UNITED STATES PATENT OFFICE
CERTIFICATE OF CORRECTION

Patent No. 3,527,836  Dated September 8, 1970

Inventor(s) Leonard Turner and Philip John Hunter

It is certified that error appears in the above-identified patent and that said Letters Patent are hereby corrected as shown below:

Columns 3 and 4 "Table 1" column headed "n-Hexenes", line 3 for "6.25" read --62.5--.

SIGNED AND
SEALED
DEC 15 1970

(SEAL)
Attest:

Edward M. Fletcher, Jr.
Attesting Officer

WILLIAM E. SCHUYLER, JR.
Commissioner of Patents